United States Patent [19]

Rivera et al.

[11] Patent Number: 4,980,222

[45] Date of Patent: * Dec. 25, 1990

[54] TAMPER INDICATING TAPE

[75] Inventors: Raymond R. Rivera; Shari J. Wilson; Stephen B. Vanvleet, all of St. Paul, Minn.

[73] Assignee: Minnesota Mining and Manufacturing Company, St. Paul, Minn.

[*] Notice: The portion of the term of this patent subsequent to Oct. 24, 2006 has been disclaimed.

[21] Appl. No.: 367,752

[22] Filed: Jun. 21, 1989

[51] Int. Cl.$^5$ .................................................. B32B 9/00
[52] U.S. Cl. .................................. 428/195; 428/34.2; 428/40; 428/915; 428/916; 283/105
[58] Field of Search ................. 428/34.2, 40, 915, 916, 428/195; 283/105

[56] References Cited

U.S. PATENT DOCUMENTS

| | | | |
|---|---|---|---|
| 4,454,956 | 6/1984 | Patterson | 283/105 |
| 4,557,505 | 12/1985 | Schaefer et al. | 283/81 |
| 4,630,891 | 12/1986 | Li | 350/105 |
| 4,652,473 | 3/1987 | Han | 428/35 |
| 4,785,940 | 11/1988 | Wilson | 205/632 |
| 4,876,123 | 10/1989 | Rivera et al. | 428/34.2 |

*Primary Examiner*—Patrick Ryan
*Attorney, Agent, or Firm*—Donald M. Sell; Walter N. Kirn; David L. Weinstein

[57] ABSTRACT

A tamper indicating tape for use with a closure or container. The tape comprises a film including phase separated polymers. Colored indicia are applied to opposing major surfaces of the film indicative of a condition that someone has tampered with the tape, e.g., tape removal and reattachment, or abrading. The film further bears a layer of adhesive thereon as a means for adhering the tape to a portion of a container or to a closure tape on a can lid. When the film of the tamper indicating tape is sufficiently split, one set of colored indicia is obscured and the other set of colored indicia is rendered perceptible. When the film is abraded to remove the perceptible set of colored indicia, the aforementioned obscured set of colored indicia is rendered perceptible.

22 Claims, 2 Drawing Sheets

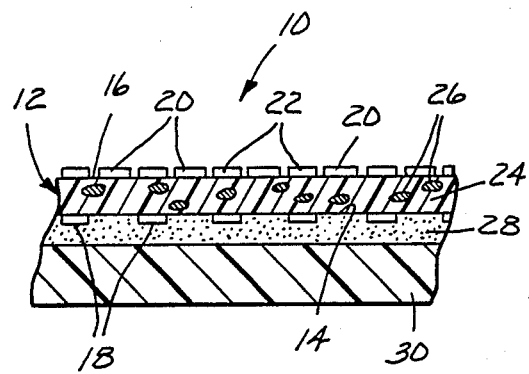
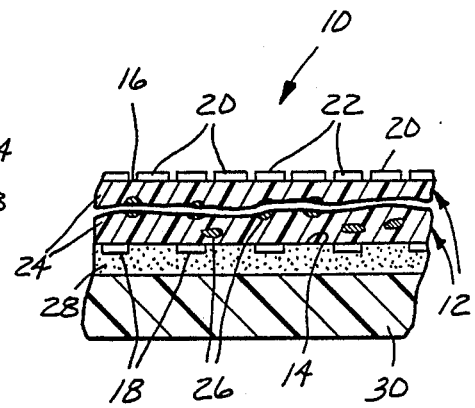
Fig.1A　　　　Fig.1B
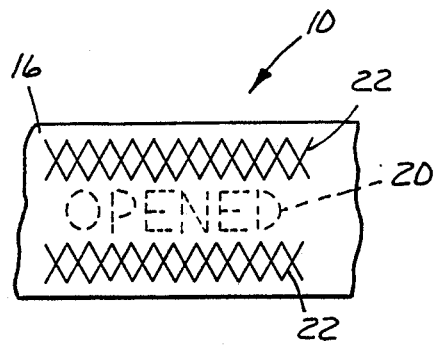
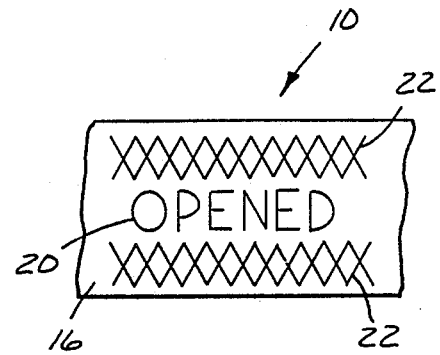
Fig.2A　　　　Fig.2B
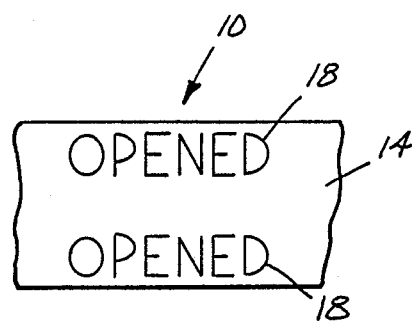
Fig.2C

TAMPER INDICATING TAPE

BACKGROUND OF THE INVENTION

1. Field of the Invention

The present invention relates to a tamper indicating tape made from a film capable of splitting internally for use with a package to indicate opening of the package.

2. Discussion of the Art

In grocery stores, packages, e.g., boxes, cans, bags, are subject to entry by various classes of tamperers. One type of tamperer primarily opens the package, consumes all or a portion of the contents, reseals the package, and then places the resealed package back on the shelf. Another type of tamperer primarily opens the package, introduces a foreign object therein, e.g., poison, reseals the package, and then places the resealed package back on the shelf. In the first situation, there is little possibility of physical harm to the consumer, so the store manager can merely discard the tampered package. In the second situation, a rumor involving introduction of foreign objects can lead to an expensive recall of all of the products packaged in packages identical to the tampered package.

U.S. Pat. No. 4,652,473 discloses a pressure-sensitive adhesive tape comprising a backing having two separate layers that delaminate. The outer layer has sufficiently high tensile strength to maintain its integrity when removed from the tape and the inner layer adjacent the adhesive is thin and deformable, so that the outer layer cannot be removed from the inner layer without disrupting the adhesive bond of the inner layer to the pressure-sensitive adhesive, thereby providing tamper indication.

U.S. Pat. No. 4,630,891 discloses a tamper resistant security film comprising a monolayer of transparent microspheres supported in a thin layer of binder material. A layer of pressure-sensitive adhesive is coated onto the binder material and at least one patterned layer having differential adhesion to the pressure-sensitive adhesive layer and the binder layer such that upon attempted removal of the film from a substrate at elevated temperature, the film splits, with part of the film remaining on the substrate and part being removed, thereby providing tamper indication.

U.S. Pat. No. 4,557,505 discloses a stress-opacifying tamper indicating tape for use on closures. The tape comprises a stress opacifying translucent polymeric backing having an exposed surface on which is printed indicium by the use of a colored ink material which is preferably translucent and on the opposite surface of the backing is indicium of a contrasting color which opposite surface is also flood coated and colored in the background areas of the contrasting color indicium with a color substantially similar to that of said printed indicium on the exposed surface. The stress opacifying backing will become opaque when subjected to stress and produce a color which will enhance the printed indicium and obliterate the contrasting color indicium.

None of the tapes in the foregoing references are effective against both the consuming tamperer and the adulterating tamperer.

SUMMARY OF THE INVENTION

The present invention provides a tamper indicating tape for use on closures and containers. The tamper indicating tape comprises a light transmissive film having opposing first and second major surfaces, which film is derived from a composition comprising 50 to 85 parts by weight (pbw) of a first copolymer comprising at least one moiety derived from at least one olefinic monomeric unit and 50 to 15 pbw of a second copolymer comprising at least one moiety derived from at least one vinyl alcohol monomeric unit, said second copolymer being sufficiently incompatible with said first copolymer such that two phases are formed within said film, one of said phases being continuous.

First colored indicia are printed on the first major surface of the film and second colored indicia are printed on the second major surface of the film. The first major surface of the film is the surface facing toward the closure or container. The second major surface of the film is the surface facing away from the closure or container. The colors of the first and second indicia are contrasting, e.g., red and blue. Third colored indicia capable of masking the first colored indicia of the film are applied to the second major surface of the film. Third colored indicia are typically of the same color as first colored indicia. Third colored indicia is in register with first colored indicia. Second colored indicia is in register with neither first colored indicia nor with third colored indicia.

Means for adhering the film to the closure or container are provided on said first major surface of the film. In order to obscure the second colored indicia, the adhesive can be colored so as to be of the same color as the second colored indicia. Alternatively, if a transparent adhesive is desired, the first major surface of the film can be flood coated with a colorant having the same color as the second colored indicia to obscure the second colored indicia.

The strength of the bond between the adhesive means and the film, i.e., the peel strength, should exceed the cohesive strength of the film. When the film is split internally, such as when the tape is attempted to be removed from the surface of a container and reattached, the film becomes opaque so that the first colored indicia are obscured when one views the split film, but the second colored indicia are perceptible when one views the split film, thereby indicating removal of the tape from the closure or container and attempted reattachment thereof.

It has also been discovered that the light transmissive film becomes opaque when it is flexed with sufficient force or otherwise subjected to stress. This characteristic makes it suitable for use as a tamper indicating tape for a can lid. The act of peeling a closure tape from a can lid such that the light transmissive film of the tamper indicating tape is caused to be severely flexed, causes the film to split internally, thereby allowing the second colored indicia to be perceptible.

When a tamperer tries to remove the film as by abrading, e.g., by peeling or scraping, to obliterate the warning message of the second colored indicia, a back-up warning message (the first colored indicia) indicating tampering can be perceived.

Thus a tamper indicating tape made from a light transmissive film is provided that is effective, easy to use, and capable of providing both an initial warning message and a back-up warning message to the consumer.

BRIEF DESCRIPTION OF THE DRAWINGS

The present invention will be further described with reference to the accompanying drawing wherein like reference numerals refer to like parts in the several views, and wherein:

FIG. 1A is a cross-sectional view of a tamper indicating tape constructed according to the present invention.

FIG. 1B is a cross-sectional view of the tamper indicating tape of FIG. 1A after the film has been split internally.

FIG. 2A is a top view of a tamper indicating tape according to this invention.

FIG. 2B is a top view of the tamper indicating tape of FIG. 2A after the film has been split internally.

FIG. 2C is a top view of the tamper indicating tape of FIG. 2A after an attempt has been made to remove the film by abrading.

DETAILED DESCRIPTION

Figure 3:
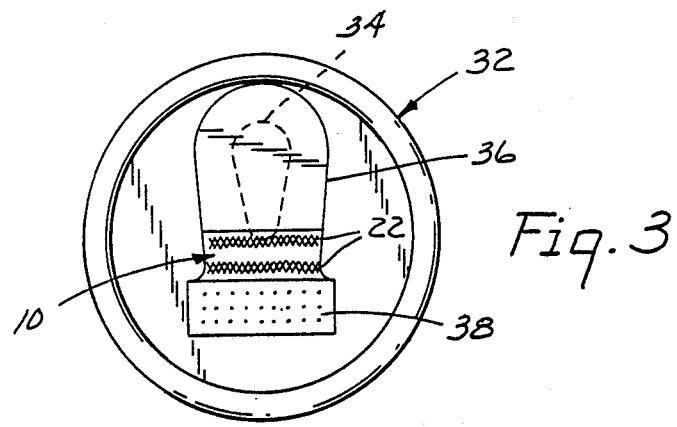
FIG. 3 is a perspective view of a can lid having a tamper indicating tape according to this invention to enclose an opening in the can lid.

Referring now to the drawings, there is shown in FIGS. 1A, 1B, 2A, 2B, and 2C a tamper indicating tape according to the present invention generally designated by the reference numeral 10. Tape 10 comprises a light transmissive film 12 having a first major surface 14 and a second major surface 16. Film 12 is constructed so that the film splits internally (i.e., between first and second major surfaces 14 and 16) when a predetermined level of force is applied to the film.

First colored indicia 18 are printed on first major surface 14 and second colored indicia 20 are printed on second major surface 16 of film 12. As is shown particularly in FIGS. 2A and 2B, first colored indicia 18 indicates a given condition of the tape, and second colored indicia 20 indicates a similar condition of the tape. First colored indicia 18 typically include alphanumeric characters forming a message that the container has been opened. Second colored indicia 20 typically include alphanumeric characters forming a message that the container has been opened. For example, first colored indicia 18 might consist of a line of print made up of the alphanumeric characters "OPENED"; second colored indicia 20 might also consist of a line of print made up of the alphanumeric characters "OPENED". As will be seen later, second colored indicia 20 is the primary warning message, and first colored indicia 18 is the back-up warning message. First colored indicia 18 and second colored indicia 20 have contrasting colors. For instance, first colored indicia 18 may be colored blue and second colored indicia 20 may be colored red.

Third colored indicia 22 are printed on second major surface 16 of film 12. Third colored indicia 22 can be a bar or a pattern, repeating or otherwise, that is substantially the same color as first colored indicia 18 of film 12. The message initially visible from third colored indicia 22 would convey no information, but would merely mask first colored indicia 18. However, if one attempted to remove film 12 as by abrading, e.g., by peeling or scraping, first colored indicia of film 12 would be perceptible and would provide a warning message. Third colored indicia 22 is in register with first colored indicia 18. Second colored indicia 20 is in register with neither first colored indicia 18 nor with third colored indicia 22.

Light transmissive film 12 is fully described in assignee's copending U.S. Ser. No. 07/212,412, filed June 27, 1988.

Film 12 is derived from a composition comprising 50 to 85 pbw of a first copolymer comprising at least one moiety derived from at least one olefinic monomeric unit and 50 to 15 pbw of a second copolymer comprising at least one moiety derived from at least one vinyl alcohol monomeric unit.

In one embodiment of the invention, the first copolymer includes up to 15 pbw of monomeric units derived from a polar copolymerizable monomer substantially free of hydroxy (—OH) groups. Representative examples of such monomers include the following: acrylic acid, acrylonitrile, bicyclo [2,2,1] hept-2-ene, bis ($\beta$-chloroethyl) vinylphosphonate, carbon monoxide, diethyl fumarate, diethyl maleate, ethyl acrylate, methacrylic acid, N-methyl-N-vinylacetamide, styrene, vinyl acetate, vinyl chloride, and vinyl fluoride. Preferably, the polar copolymerizable monomer includes moieties derived from one of the following monomeric units: acrylic acid, methacrylic acid, and vinyl acetate.

In a preferred embodiment, the first copolymer comprises at least 90 pbw olefinic monomeric units having between 2 and 4 carbon atoms; in the most preferred embodiment, the first copolymer comprises about 97 pbw propylene monomeric units and from about 2.2 pbw to about 2.7 pbw ethylene monomeric units.

In a preferred embodiment, the second copolymer comprises hydrolyzed ethylene vinyl acetate monomeric units; in the most preferred embodiment, the second copolymer comprises ethylene vinyl alcohol monomeric units.

The second copolymer is sufficiently incompatible with the first copolymer such that two phases 24 and 26 form within film 12. One of said phases 24 is continuous, preferably the phase formed by the first copolymer. The other of said phases 26, preferably that formed by the second copolymer, forms a multiplicity of inclusions in film 12, typically ellipsoidal in shape.

In the most preferred embodiment of the invention, film 12 comprises about 75% by weight of the first copolymer and about 25% by weight of the second copolymer. The first copolymer comprises about 97 pbw propylene monomeric units and from about 2.2 pbw to about 2.7 pbw ethylene monomeric units. The second copolymer is ethylene vinyl alcohol. The ellipsoidal inclusions of phase 26 formed by the second copolymer have been measured and found to have diameters ranging from approximately 0.8 to 3.3 microns and lengths ranging from approximately 1.6 to 13.1 microns. While not wishing to be bound by any theory, it is believed that the inclusions of phase 26 formed by the second copolymer provide a pattern of weaknesses within continuous phase 24 of the first copolymer. Thus, the force required to split film 12 internally is predetermined at a desired level depending on the materials selected and their relative ratios. If the second polymer provides more than 50 pbw of the film, the second copolymer begins to form a continuous phase and the film is no longer capable of splitting internally.

Film 12 has high light transmissivity levels and low haze, even though the phase separated morphology due to the incompatibility of the first and second copolymers would be expected to form opaque films. It is believed that the relative size of the inclusions and the closeness of the indices of refractions of the components of the film are such that film 12 has good light transmissive properties.

Film 12 may be produced by any suitable film generating process, but is preferably produced by dry blending the first and second polymers together, air drying the blend at 200° F. for 48 hours, then extruding the blend onto a driven chilled roll. Preferably, the film is at least 0.003 inches in thickness. At thicknesses less than 0.003 inches, voids form on the surfaces of the film.

It should be noted that film 12 can be caused to split internally regardless of the manner in which forces or stresses are applied thereto. However, film 12 splits internally more readily when forces or stresses are applied in the machine direction.

Inks that are suitable for providing colored indicia on major surfaces 14 and 16 of film 12 include flexographic inks. These inks are described in *Encyclopedia of Chemical Technology*, 3rd Edition, Vol. 13, John Wiley & Sons, Inc. (New York:1981), pp. 389–392, incorporated herein by reference.

Tape 10 also comprises a layer of adhesive 28 to adhere film 12 to a portion of a container 30. Layer of adhesive 28 may be covered by a removable liner (not shown), such as a silicone release liner, prior to application to a closure or a container. Although any suitable adhesive can be used, such as a heat activated adhesive or a pressure-sensitive adhesive, in the preferred embodiment, the layer of adhesive comprises a pressure-sensitive adhesive, such as a resin tackified synthetic rubber adhesive, and, in particular, styrene-butadiene rubber, styrene-isoprene-styrene block copolymer, and styrene-butadiene-styrene block copolymer; an acrylic adhesive, and, in particular, isooctylacrylate-acrylic acid; or a tackified natural rubber adhesive. For example, a pressure-sensitive adhesive comprising styrene-isoprene-styrene block copolymer tackified with hydrocarbon resin has been found suitable for use in the tamper indicating tape of this invention.

Layer of adhesive 28 bonds film 12 to a surface 30, e.g., a portion of a container, with a bond strength, i.e., peel strength, that is greater than the cohesive strength of film 12. Layer of adhesive 28 can be colored with a color substantially identical to the color of second colored indicia 20 so that second colored indicia 20 are obscured when the tape is viewed prior to any kind of tampering. Alternatively, first major surface 14 of film 12 can be flood coated with a colorant substantially identical in color to the color of second colored indicia 20 to obscure second colored indicia 20 prior to any kind of tampering.

Figure 4:
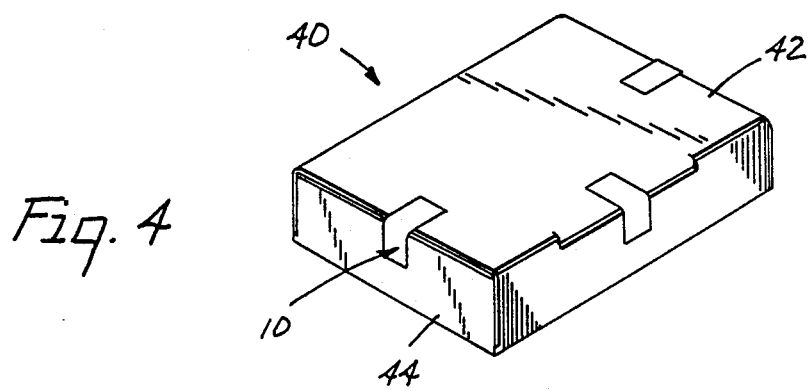
FIG. 4 is a perspective view of a tamper indicating tape according to this invention used as a closure on a box.

Tape 10 can be used with many types of containers and portions thereof. For example, tape 10 is particularly desirable for a container that utilizes a can lid 32, such as the type described in U.S. Pat. No. 4,557,505. FIG. 3 depicts a can lid 32 having an aperture 34 covered and sealed by a closure tape 36, with tamper indicating tape 10 being firmly adhered to the upper surface of closure tape 36. Closure tape 36 is firmly adhered to can lid 32 by means of a layer of adhesive (not shown). Tamper indicating tape 10 has one or more rows of bars or repeating patterns, e.g., X-marks, formed by third colored indicia 22 clearly visible on the surface showing that tape 10 has not been affected by tampering. Tape 10 can also be used for a two-piece box 40, such as the type described in assignee's copending U.S. Ser. No. 07/212,412, filed June 27, 1988. FIG. 4 depicts a two-piece box 40 having a top portion 42 and a bottom portion 44 with tamper indicating tape 10 being firmly adhered to top portion 42 and bottom portion 44. Tamper indicating tape 10 has one or more rows of bars or repeating patterns, e.g., X-marks, formed by third colored indicia 22 clearly visible on the surface showing that tape 10 has not been affected by tampering.

Operation of the Tamper Indicating Tape

Referring to FIG. 3, upon removal of closure tape 36 to allow access to aperture 34 by pulling on grip 38, film 12 of the tape 10 is flexed with sufficient force to cause film 12 to split internally.

Upon internal splitting of film 12, the separated portions of film 12 become opaque on account of surface irregularities in the exposed internal surfaces of film 12 created during the splitting thereof. As shown in FIG. 2B, second colored indicia 20 are no longer obscured by the background of colored layer of adhesive or the flood coat, but are now readily perceptible against the background of film 12, which is now opaque. This provides a first indication of possible unauthorized access to the contents of the container to which can lid 32 is attached.

Referring to FIG. 4, upon attempted removal of tape 10 from portion 42 or portion 44 to allow access to the contents of box 40, film 12 of tape 10 internally splits at predetermined level of peel force. The separated portions of film 12 become opaque for the reason described previously, thereby rendering second colored indicia 20 perceptible against the background of film 12. As stated previously, second colored indicia 20 provide a first indication of unauthorized access to the contents of box 40. Separated portions of film 12 will not readhere to each other once separated, further providing an indication of unauthorized access to the interior of box 40.

With respect to can lids and boxes, if the tamperer attempts to abrade film 12 from tape 10, as by peeling or scraping, second colored indicia 20 and third colored indicia 22 can be removed, thereby exposing first colored indicia 18, which is readily perceptible against the background of colored layer of adhesive or the flood coat. This provides a second indication of possible unauthorized access to the contents of the container to which can lid 32 is attached or to the contents of box 40.

The following examples and test results are used to further illustrate this invention:

EXAMPLE 1

A blend of 75 pbw of a propylene/ethylene copolymer containing 2.7 pbw ethylene monomeric units of the copolymer (available from Fina Oil and Chemical Company, Houston, Texas) and 25 pbw of an ethylene vinyl alcohol copolymer containing 44 mole percent ethylene and being essentially completely hydrolyzed (available from Eval Company of America, Lisle, Illinois) was fed into a ¾ inch Haake Extruder having a 25:1 length/diameter ratio at a temperature of 430° F. and 1200 p.s.i. pressure. The extruder screw used had a 3:1 compression ratio and was run at 70 r.p.m. with the die orifice set at 15 mils. The molten film from the die was cast onto a chilled chrome roll at 50°–100° F. and at a speed of 25 feet per minute and drawn to form a 3 mil thick film. The film was then tested according to the test methods listed below and the results are shown in Table I.

TEST METHODS

1. Splitting Test

A 4 inch (10 cm) piece of Scotch Brand 600 tape was folded to itself with 0.5 inch overlap to form a tab. The tape was rolled at about 12 inches/minute using a 4.5 pound roller onto a film constructed according to the present invention. An alligator clip was then attached to the tab and attached to the end of a 2 pound Ametek Force Gauge. The tab was pulled back at about 12 inches/minute at a 180° angle from the film. As the tab peeled off, the film split internally and the reading on the dial was recorded.

2. Instron Tensile Tester

This was tested according to ASTMD 3759-79. A specimen of the film of this invention, not more than 2 inches in width was clamped in the grips of an Instron Tensile Tester, taking care to align the long axis of the specimen with an imaginary line running between the points of attachment of the grips and including the center of the grips. No more tension was applied during clamping than was necessary to remove slack. The crosshead was set in motion at about 2 inches/minute and F-1, F-3, breakstrength, percent elongation at break were recorded. (F-1 values are defined as force required to stretch the specimen 1%; F-3 values are defined as force required to stretch the specimen 3%).

3. Light Transmittance Test

A model Aux-10 Gardner Pivotable-Sphere Hazemeter was used for this test. The hazemeter was first turned on and allowed to warm up for 15 minutes. Source "A" was selected for CIE illuminator. With no specimen in place and with light trap in the rear position, the digital read out was set to zero ($T_3$ value) using the zero adjustment. The pivot sphere was then moved forward and the digital read out was then set to 100.0 ($T_1$ value) using the calibrator control. A film specimen of about 1 inch×1 inch was then put in the specimen holder and the percent transmittance or optical clarity ($T_2$ value) was recorded. The sphere was pivoted backwards and a second reading ($T_4$ value) was also recorded. Percent haze was calculated from the following formula: $T_4/T_2 \times 100 = \%$ haze.

TABLE I

| Tensile Testing | | | |
|---|---|---|---|
| F-1 | F-3 | Breakstrength (lbs) | Elongation at break (%) |
| 1.0 | 2.0 | 3.4 | 427 |

| Splitting Test | |
|---|---|
| Shiny side (oz/in) | Matte side (oz/in) |
| 7.5 | 7.5 |

| Light Transmittance | |
|---|---|
| Transmittance (%) ($T_2$) | Haze (%) |
| Before Splitting | |
| 88.5 | 40.2 |
| After Splitting | |
| 81.1 | 67.5 |

On one major surface of the film, i.e., the first major surface, a series of the term "OPENED" was printed thereon with blue ink (IPI Printing Ink, Inmont Corp.). On the major surface of the film opposite the surface whereon "OPENED" was printed with blue ink, i.e., the second major surface, a series of the term "OPENED" was printed with red ink (IPI Printing Ink, Inmont Corp.). The series of the term "OPENED" in red ink was not in register with the series of the term "OPENED" in blue ink. On the second major surface of the film was printed a series of bars in blue ink (IPI Printing Ink, Inmont Corp.). The bars were in register with the series of the term "OPENED" of the first major surface. A layer of pressure-sensitive adhesive was then coated over the first major surface of the film to form a tamper indicating tape. The adhesive was colored red and contained the following ingredients in the amounts indicated:

| Ingredient | Amount (phr) |
|---|---|
| Styrene-isoprene-styrene block copolymer ("Kraton" 1107, Shell Oil Co.) | 100 |
| Hydrocarbon tackifying resin ("Wingtack Extra", The Goodyear Tire and Rubber Company) | 100 |
| Antioxidant ("Cyanox", American Cyanamid Co.) | 1.5 |
| Antioxidant ("Irganox", Ciba-Geigy Limited) | 1.5 |
| Red pigment | 10.7 ± 5 |

The adhesive was applied as a solution containing 40% by weight dry solids in toluene solvent. The coating weight was approximately 33.5 g/m². Samples of the tamper indicating tape thus formed were applied over closure tapes covering the openings in a series of can lids.

Upon application of the tamper indicating tape, the only indicia visible thereon were the bars in blue ink.

Upon removal of the closure tape from the can lid, the indicia visible were the series of the term "OPENED" in red ink.

Upon removal of the film from the can lid by scraping, the indicia visible were the series of the term "OPENED" in blue ink.

The present invention has now been described with reference to several embodiments thereof. It will be apparent to those skilled in the art that many changes can be made in the embodiments described without departing from the scope of the present invention. Thus, the scope of the present invention should not be limited to the structures described in this application, but only by structures described by the language of the claims and the equivalents of those structures.

WHAT IS CLAIMED IS:

1. A tamper indicating tape comprising:
   (a) a light transmissive film derived from a composition comprising 50 to 85 parts by weight of a first copolymer comprising at least one moiety derived from at least one olefinic monomeric unit and 50 to 15 parts by weight of a second copolymer comprising at least one moiety derived from at least one vinyl alcohol monomeric unit and said second copolymer being sufficiently incompatible with said first copolymer to form two phases within said film, one of said phases being continuous, said film having a first major surface and a second major surface;
   (b) first colored indicia printed on said first major surface of said film;
   (c) second colored indicia printed on said second major surface of said film, said first and second colored indicia being of contrasting colors;

(d) third colored indicia printed on said second major surface of said film, said third colored indicia obscuring said first colored indicia;

(e) means for adhering said film to a portion of a container, said adhering means capable of bonding said film to said container with an adhesive bond between said film and said container having a peel strength greater than the cohesive strength of said film, said adhesive means being applied to said first major surface of said film; and (f) said first major surface of said film, or said means for adhering said film to a portion of a container, or both, being of a color substantially similar to that of said second colored indicia, whereby when said tape is adhered to a container only said third colored indicia is perceptible if tampering has not occurred.

2. The tape of claim 1, wherein said first copolymer of said film comprises at least 90 parts by weight propylene monomeric units.

3. The tape of claim 2, wherein said first copolymer of said film comprises about 97 parts by weight propylene monomeric units and from about 2.2 parts by weight to about 2.7 parts by weight ethylene monomeric.

4. The tape of claim 1, wherein said first copolymer of said film further comprises up to 15 parts by weight of monomeric units from a polar copolymerizable monomer substantially free of hydroxy (—OH) groups.

5. The tape of claim 1, wherein said first copolymer of said film further comprises up to 15 parts by weight of a polar copolymerizable monomer substantially free of hydroxy (—OH) groups selected from the group consisting of acrylic acid, acrylonitrile, bicyclo [2,2,1] hept-2-ene, bis ($\beta$-chloroethyl) vinylphosphonate, carbon monoxide, diethyl fumarate, diethyl maleate, ethyl acrylate, methacrylic acid, N-methyl-N-vinylacetamide, styrene, vinyl acetate, vinyl chloride, and vinyl fluoride.

6. The tape of claim 1, wherein said first copolymer of said film further comprises up to 15 parts by weight of monomeric units from a polar copolymerizable monomer substantially free of hydroxy (—OH) groups selected from the group consisting of acrylic acid, methacrylic acid, and vinyl acetate.

7. The tape of claim 1, wherein said second copolymer of said film is a copolymer containing monomeric units of hydrolyzed ethylene vinyl acetate.

8. The tape of claim 7, wherein said second copolymer of said film is ethylene vinyl alcohol.

9. The tape of claim 1, wherein said adhering means includes a pressure-sensitive adhesive layer coated on at least one major surface of said film.

10. The tape of claim 1, wherein said first and third colored indicia are in register and said second colored indicia is not in register with said first and third colored indicia.

11. The tape of claim 1, wherein when, on account of tampering said film has been caused to split internally, said film becomes opaque so that said second colored indicia are perceptible.

12. The tape of claim 1, wherein when, on account of tampering said film has been abraded, said first colored indicia are perceptible.

13. An article comprising:
(a) a container having an opening therein; and
(b) a tamper indicating tape for enclosing said opening in said container, comprising:

(i) a light transmissive film having a first major surface and an opposing second major surface, said film derived from a composition comprising 50 to 85 parts by weight of a first copolymer comprising at least one moiety derived from at least one olefinic monomer and 50 to 15 parts by weight of a second copolymer comprising at least one moiety derived from at least one vinyl alcohol monomer, said second copolymer being sufficiently incompatible with said first copolymer to form two phases within said film, one of said phases being continuous, (ii) first colored indicia printed on said first major surface of said film, (iii) second colored indicia printed on said second major surface of said film, said first and second colored indicia being of contrasting colors, (iv) third colored indicia printed on said second major surface of said film, said third colored indicia obscuring said first colored indicia, (v) means for adhering said film to said container, said adhering means capable of bonding said film to said container with an adhesive bond between said film and said container having a peel strength greater than the cohesive strength of said film, said adhering means being applied to said first major surface of said film, (vi) said first major surface of said film, or said means for adhering said film to said container, or both, being of a color substantially similar to that of said second colored indicia, whereby when said tape is adhered to said container only said third colored indicia is perceptible if tampering has not occurred.

14. The article of claim 13, wherein when, on account of tampering said film has been caused to split internally, said film becomes opaque so that said second colored indicia are perceptible.

15. The article of claim 13, wherein when, on account of tampering said film has been abraded, said first colored indicia are perceptible.

16. The article of claim 13, wherein said adhering means includes a pressure-sensitive adhesive layer coated on at least one major surface of said film.

17. The article of claim 13, wherein said first and third colored indicia are in register and said second colored indicia is not in register with said first and third colored indicia.

18. An article comprising:
(a) a container having a lid thereon, said lid having an aperture therein, said aperture being covered by a closure tape adhered to said lid by means of a layer of adhesive; and
(b) a tamper indicating tape adhered to said closure tape, said tamper indicating tape comprising:

(i) a light transmissive film having a first major surface and an opposing second major surface, said film derived from a composition comprising 50 to 85 parts by weight of a first copolymer comprising at least one moiety derived from at least one olefinic monomer and 50 to 15 parts by weight of a second copolymer comprising at least one moiety derived from at least one vinyl alcohol monomer, said second copolymer being sufficiently incompatible with said first copolymer to form two phases within said film, one of said phases being continuous, (ii) first colored indicia printed on said first major surface of said film,
(iii) second colored indicia printed on said second major surface of said film, said first and second colored indicia being of contrasting colors,
(iv) third colored indicia printed on said second major surface of said film, said third colored indicia obscuring said first colored indicia,
(v) means for adhering said film to said closure tape, said adhering means capable of bonding said film to said closure tape with an adhesive bond between said film and said closure tape having a peel strength greater than the cohesive strength of said film, said adhering means being applied to said first major surface of said film,
(vi) said first major surface of said film, or said means for adhering said film to said closure tape, or both, being of a color substantially similar to that of said second colored indicia, whereby when said tape is adhered to said closure tape only said third colored indicia is perceptible if tampering has not occurred.

19. The article of claim 18, wherein when, on account of tampering said film has been caused to split internally, said film becomes opaque so that said second colored indicia are perceptible.

20. The article of claim 18, wherein when, on account of tampering said film has been abraded, said first colored indicia are perceptible.

21. The article of claim 18, wherein said adhering means includes a pressure-sensitive adhesive layer coated on at least one major surface of said film.

22. The article of claim 18, wherein said first and third colored indicia are in register and said second colored indicia is not in register with said first and third colored indicia.

* * * * *

UNITED STATES PATENT AND TRADEMARK OFFICE
CERTIFICATE OF CORRECTION

PATENT NO. : 4,980,222
DATED : December 25, 1990
INVENTOR(S) : Rivera et al.

It is certified that error appears in the above-identified patent and that said Letters Patent is hereby corrected as shown below:

Col. 9, lines 24/25, "mono-meric." should be
--mono-meric units.--

Signed and Sealed this

Eleventh Day of January, 1994

Attest:

BRUCE LEHMAN

*Attesting Officer*  *Commissioner of Patents and Trademarks*